US006792172B1

(12) United States Patent
Levy et al.

(10) Patent No.: US 6,792,172 B1
(45) Date of Patent: Sep. 14, 2004

(54) REDUCED SIZE MULTIMODE INTERFERENCE BASED COUPLER

(75) Inventors: David S. Levy, Seal Beach, CA (US); Robert Scarmozzino, Montrose, NY (US); Richard M. Osgood, Jr., Chappaqua, NY (US)

(73) Assignee: The Trustees of Columbia University of the City of New York, New York, NY (US)

( * ) Notice: Subject to any disclaimer, the term of this patent is extended or adjusted under 35 U.S.C. 154(b) by 0 days.

(21) Appl. No.: 09/674,821

(22) PCT Filed: May 8, 1998

(86) PCT No.: PCT/US98/09447

§ 371 (c)(1),
(2), (4) Date: Apr. 20, 2001

(87) PCT Pub. No.: WO99/59012

PCT Pub. Date: Nov. 18, 1999

(51) Int. Cl.[7] ................................................. G02B 6/26
(52) U.S. Cl. ............................. 385/15; 385/16; 385/17; 385/39
(58) Field of Search ........................... 385/15, 5, 9, 25, 385/31, 39, 42, 46

(56) References Cited

U.S. PATENT DOCUMENTS

| 4,362,357 | A | * | 12/1982 | Stockmann et al. | 385/46 |
|---|---|---|---|---|---|
| 5,048,909 | A | * | 9/1991 | Henry et al. | 385/27 |
| 5,379,354 | A | | 1/1995 | Jenkins | 385/46 |
| 5,410,625 | A | | 4/1995 | Jenkins et al. | 385/28 |
| 5,563,968 | A | | 10/1996 | Pennings et al. | 385/27 |
| 5,689,597 | A | * | 11/1997 | Besse | 385/39 |
| 5,953,467 | A | * | 9/1999 | Madsen | 385/15 |
| 5,970,186 | A | * | 10/1999 | Kenney et al. | 385/16 |
| 6,061,481 | A | * | 5/2000 | Heidrich et al. | 385/14 |

FOREIGN PATENT DOCUMENTS

| CH | WO 9512828 | * 11/1995 | G02B/6/28 |
|---|---|---|---|

OTHER PUBLICATIONS

"Four–Channel Integrated–Optic Wavelength Demultiplexer With Weak Polarization Dependence", Arjen R. Vellekoop and Meint K. Smit; Journal of Lightwae Technology, vol. 9, No. 3, Mar. 1991.

"A New Design for Ultracompact Multimode Interference–Based 2 x 2 Couplers", David S. Levy, Student Member, IEEE, Robert Scarmozzino, York M. Li and Richard M. Osggod, Jr., Fellow, IEEE; IEEE Photonics Technology Letters, vol. 10, No. 1, Jan. 1998.

"Extremely Small Multimode Interference Couplers and Ultrashort Bends on InP by Deep Etching", L.H. Spiekman, Y.S. Oei, E.G. Metaal, F.H. Groen, I. Moerman, and M.K. Smit; IEEE Photonics Technology Letters, vol. 6, No. 8, Aug. 1994.

(List continued on next page.)

Primary Examiner—Frank G. Font
Assistant Examiner—Kevin C. Kianni
(74) Attorney, Agent, or Firm—Baker Botts, LLP (57) ABSTRACT

The Multimode Interference coupler according to the invention has smoothly continuous inwardly tapered sidewalls (301) which define the width of the multimode region (W1) along the propagation axis of the device. The inward taper causes the average width of the device to be reduced in comparison to known couplers having straight sidewalls (202). Further, invention allows the access waveguides (303, 309) to remain sufficiently spaced, while reducing the overall length of the device, to avoid lithographic gap fill-in and unwanted optical coupling between the waveguides.

17 Claims, 4 Drawing Sheets

OTHER PUBLICATIONS

"A Very Compact InP–Based Integrated Optic Mach–Zehnder Interferometer with a Delay Difference of 74 ps", R. Baets, C. Wei. G. Dobbelaere, j. Haes, O. van Hoorebeke, T. Tanghe, P. De Dobbelaere, I. Moerman; University of Gent–IMEC, Department of Information Technology (INTEC); X.J.M. Leijtens, A.H. de Vreede, M.K. Smit; Delft University of Technology, Department of ELectrical Enigneering, The Netherlands; E.G. Metaal, PTT Research, The Netherlands.

"Ultracompact, Low–Loss Directional Couplers on InP Based on Self–Imaging by Multimode Interference", E.C.M. Pennings, R.J. Deri, A. Scherer. R. Bhat, T.R. Hayes, N.C. Andreadakis, M.K. Smith, L.B. Soldano, and R.J. Hawkins; (Received Jun. 12, 1991; accepted for publication Aug. 12, 1991); Appl. Phys. Lett. 59 (16) Oct. 14, 1991.

"Compact Planar 980/1550–nm Wavelength Multi/Demultiplexer Based on Multimode Interfernece", M.R. Paiam, Student Member, IEEE, C.R. Janz, Student Member, IEEE, R.I. MacDonald, Senior Member, IEEE, and J.N. Broughton; IEEE Photonics Technology Letters, vol. 7, No. 10 Oct. 1995.

"Nove. 1xN and NxN Integrated Optical Switches Using Self–Imaging Multimode GaAs/AIGaAs Waveguides"; R.M. Jenkins, J.M. heaton, D.R. Wight, J.T. Parker, J.C.H. Birbeck, G.W. Smith and K.P. Hilton; (Defense Research Agency (DRA), Electronics Division, St. Andrews Road, Great Malvern, Worchester WR14 3PS, United Kingdom; (Received Sep. 24, 1993; accepted for publication Nov. 19, 1993); Appl. Phys. Lett. 64 (6), Feb. 7, 1994.

"Compact InP–Based Ring Lasers Employing Multimode Interference Couplers and Combiners"; R. van Roijen, E.C.M. Pennings, M.J.N. van Stalen, T. van Dongen, B.H. Verbeek, and J.M.M. van der Heijden (Philips Optoelectronics Centre, Prof. Holstlaan 435656 AA Endhoven, The Netherlands (Received Sep. 27, 1993; accepted for publications Jan. 10, 1994) Appl. Phys. Lett. 64 (14), Apr. 4, 1994.

"General Self–Imaging Properties in NxN Multimode Interference Couplers Including Phase Relations", The Authors are with the Institute fo Quantum Electronics, Swiss Federal Institute of Technology, CH–8093 Zurich, Switzerland. Received Jun. 1, 1993; revised manuscript received Oct. 20, 1993. Jun. 20, 1994, vol. 33, NO. 18, Applied Optics.

Proceedings of SPIE Reprint—Reprinted from Integrated Optic Devices II, Jan. 28–30, 1998, San Jose, California ©1998 by te Society of Photo–Optical Instrumentation Engineers, Box 10, Bellingham, Washington 98227, U.S.A.

"Planar Monomode Optical Couplers Based on Multimode Interference Effects", B. Soldano, Frank B. Veerman, Meint K. Smit, Bastiaan H. Verbeek, Alain H. Dubost, and Erik C.M. Pennings; Journal of Lightwave Technology, vol. 10, No. 12, Dec. 1992.

"Optical Multi–Mode Interference Devices Based on Self–Imaging: Principles and Applications", Lucas B, Soldano and Erik C.M. pennings, Member, IEEE; Journal of LIghtwave Technology, vol. 13, No. 4, Apr. 1995.

"Optical Bandwidth and Fabrication Tolerances of Multimode Interference COulers", Pierre A. Besse, Maurus Bachmann, H.Melchoir, L.B. Soldano, and M.K. Smit; Journal of Ightwave Technology, vol. 12, No. 6, Jun. 1994.

"Extremley Small Multimode Inteference Couplers and Ultrashort Bends on InP by Deep Etching", L.H. Spiekman, Y.S. Oei, E.G. Metaal, F.H. Groen, I. Moerman, and M.K. Smit; IEEE Photonics Technology Letters, vol. 6, No. 8, Aug. 194.

"Mode–Width Expanders based on the Self Imaging Effect in Tapered Multimode GaAs/A1GaAs Waveguides", W.J. Simpson*, J.M. Heaton, S. Jones, J.C.H. Birbeck, K.P. Hilton, J.R. James* and D.R. Wight, DRA Malvern, Malvern, Worcs, U.K. WR14 3PS; *RMCA Shrivenham, Cranfield University, swindon, U.K.

"Scattering in Low–Loss GaAs/A1GaAs Rib Waveguides", R.J. Deri, E. Kapon and L.M. Schiavone, Bell Communications Reserach, 331 Newman Springs Road, Red Bank, New Jersey 07701–7020; (received Jun. 1, 1987; accepted for publication Jul. 14, 1987); Appl. Phys. Lett. 51 (11), Sep. 14, 1987.

"Scattering Loss from Rough Sidewalls in Semiconductor Rib Waveguides", Electronics Letters, vol. 25, p. 1231–2, 1989.

"New 2x2 and 1x3 Multimode Interference Couplers with Free Selection of Power Splitting Ratios", Pierre A. Besse, Emilio Gini, Maurus Bachmann, and Hans Melchior, Fellow IEEE; Journal of Lightwave Technology, vol. 14, No. 10, Oct. 1996.

"Optical Multi–Mode Interference Devices Based on Self–Imaging: Principles and Applications", Lucas B. Soldano and Erik C.M. Pennings, Member, IEEE, Journal of ILghtwave Technology, vol. 13, No. 4, Apr. 1995.

"Length Reduction of Tapered NxN MMI Devices", IEEE Photonics Technology Letters, David S. Levy, Robert Scarmossino, Richard M. Osgood, Jr.; vol. XX, No. Y,1997.

"A New Design fo rUltracompact Multimode Interference–Based 2 x 2 Couplers"; David S. Levy, Student Member, IEEE, Robet Scarmozzino, York M. Li, and Richard M. Osgood, Jr., Fellow, IEEE; IEEE Photonics Technology Letters, vol. 10, No. 1, Jan. 1998.

* cited by examiner

REDUCED SIZE MULTIMODE INTERFERENCE BASED COUPLER

SPECIFICATION

The United States Government has a paid-up license in this invention and the right in limited circumstances to require the patent owner to license others on reasonable terms as provided for by the terms of Contract No. F49620-95-0403 awarded by the Defense Army Research Projects Agency/Air Force Office of Scientific Research.

BACKGROUND OF INVENTION

Multimode interference (MMI) based devices have become important components within integrated optical circuits. The operation of optical MMI devices is based on the self-imaging principle of multimode waveguides wherein an input field profile is reproduced in multiple "images" at periodic intervals along the propagation axis of the waveguide such that the MMI device can function, for example as a power splitter or other device. The basic well known structure of an MMI coupler requires a relatively wide multimode waveguide region designed to support a large number of modes. In order for light to enter and exit from the relatively wide multimode waveguide region, a number of relatively narrow access waveguides are placed at the beginning and end of the MMI region. Devices configured as such are generally referred to as N×M MMI couplers, where N and M are the respective number of input and output waveguides (collectively known as access waveguides). A review of MMI devices may be found in *Soldano and Pennings, Optical Multi-Mode Interference Devices Based on Self-Imaging: Principles and Applications*, Journal of Lightwave Technology, Vol. 13, No. 4, April 1995.

Integrated optical circuits which currently require N×M power splitters include ring lasers, Mach-Zehnder interferometers and optical switches. See, P. A. Besse, M. Bachmann, H. Melchior, L. B. Soldano, and M. K. Smit, *Optical Bandwidth and Fabrication Tolerances of Multimode Interference Couplers*, Journal of Lightwave Technology, Vol. 12, pp. 1004–1009, 1994; L. B. Soldano and E. C. M. Pennings, *Optical Multi-mode Interference Devices Based On Self-imaging: Principles and Applications*, Journal of Lightwave Technology, Vol. 13, pp. 615–627, 1995; and L. H. Spiekman, Y. S. Oei, E. G. Metaal, F. H. Groen, I. Moerman, and M. K. Smit, *Extremely Small Multimode Interference Couplers and Ultrashort Bends on InP By Deep Etching*, IEEE Photon. Technol. Lett., Vol. 6, pp. 1008–1010, 1994. Perhaps the most important current MMI structure is the 2×2 coupler due to its applicability to all of these devices, the most common being the "3-dB" power splitter which will separate an input signal into two output signals of approximately equal power. Other MMI based devices include mode width expanders or spot size converters which are used to magnify or diminish the intensity distribution of the periodic images within a multimode region. See, e.g., Simpson et al., *Mode-Width Expanders Based on the Self Imaging Effect in Tapered Multimode GaAs/AlGaAs Waveguides*, Proc. 7th Eur. Conf. on Int. Opt., 1995 at 29. Applications may be expected to multiply, for example, due to improvements in telecommunications networks which require flexibility, increased capacity and reconfigurability, all of which can be enhanced by the use of photonic integrated circuits for optical communications. To date, known MMI based devices that maintain approximately even power distribution across the output images have been configured using straight sidewalls to confine the MMI region.

To better use these MMI devices for large scale photonic integrated circuit production, there is a desire to make these devices with smaller dimensions and improved fabrication tolerances. Currently, for example, "straight" 3-dB MMI couplers have decreased to the "extremely small" regime with typical limits in length of a few hundred microns. Length scaling of MMI devices is most readily done via control of the width of the MMI region, $W_{MMI}$. A straight 3-dB coupler has a device length, $L_{MMI}$, proportional to the square of the width of the MMI device, i.e., $L_{MMI} \propto W^2_{MMI}$.

The width, $W_{MMI}$, for a straight 2×2 coupler must be greater than or approximately equal to the combined width of the two input waveguides plus the width of the MMI region between the access waveguides. This total width has practical limitations that constrain further reducing the device size/length. At least the following limitations exist.

First, the width of the region between sets of access waveguides, which in turn restricts the lower limit of $W_{MMI}$, cannot be smaller than manufacturing tolerances allow. Manufacturing defects such as lithographic gap fill-in can occur when the devices are patterned on a semiconductor wafer. These defects can be caused by optical (or electronic) proximity effects encountered during the photolithographic (or electron-beam lithographic) patterning, poor image contrast of the optical system (i.e., poor focusing, or aerial image contrast), or inefficient chemical process development. These defects limit the width of the region between access waveguides for practical applications. See, e.g., *Microlithography Process Technology for IC Fabrication*, D. Elliott, New York:McGraw-Hill Book Co., 1986; *VLS1 Fabrication Principles*, 2nd ed., S. Ghandi, New York:John Wiley & Sons, Inc., 1994.

Second, if access waveguides are too closely spaced there may occur unwanted power transfer between waveguides. This parasitic optical phenomena is due to the effect known as optical coupling, and further serves to limit the reduction of space between waveguides, and thus $W_{MMI}$, in practical applications. Optical or directional coupling is examined in A. Yariv, *Optical Electronics*, 4th ed., New York:Holt, Reinhard, and Winston, 1991.

Third, while it is possible to reduce $W_{MMI}$ by shrinking the width of the access waveguides while maintaining the distance between waveguides constant, this may cause unacceptable signal loss. For example, losses due to etch induced roughness of the walls of waveguides causes proportionately greater loss in thinner as opposed to thicker waveguides. Thus, if the access waveguides are made too thin, unacceptable transmission losses may occur. See, R. Deri, E. Kapon, and L. Schiavone, *Sattering in Low-Loss GaAs/AlGaAs Rib Waveguides*, Appl. Phys. Lett., Vol. 51, pp. 789–91, 1987; M. Stern, P. Kendall, R. Hewson-Browne, P. Robson, *Scattering Loss From Rough Sidewalls in Semiconductor Rib Waveguides*, Electronics Letters, Vol. 25, pp. 1231–2, 1989.

Fourth, because the manufacturing "width tolerance" of the MMI region, $\Delta W$, is proportional to the square of the width of the access waveguides, $W_{WG}$, if the access waveguides are too thin, the required manufacturing "width tolerance" will be impractical or unachievable by commercial manufacturing processes. The "width tolerance", $\Delta W$, is the variation in the designed width of the MMI region, caused by manufacturing errors, that can be tolerated and still preserve the imaging functionality of the MMI device. Because $\Delta W \propto W^2_{WG}$, it is desirable to have wider access waveguides to allow for larger manufacturing tolerances.

See, P. Besse, M. Bachmann, H. Melchior, L. Soldano, and M. Smit, *Optical Bandwidth and Fabrication Tolerances of Multimode Interference Couplers*, Journal of Lightwave Technology, Vol. 12, pp. 1004–9, 1994. However, in conventional "straight" MMI couplers, wider access waveguides can cause the entire device width to increase, thereby increasing the device size/length, in that $L_{MMI} \propto W^2_{MMI}$.

Accordingly, it is an object of the present invention to provide for N×M MMI couplers that approximately maintain the power splitting functionality across output images of MMI devices with straight line sidewalls that overcome the limitations of the prior art (1) by allowing for the manufacture of smaller MMI devices by causing the average $W_{MMI}$ to decrease; (2) by allowing for access waveguides of MMI devices to remain sufficiently spaced to avoid lithographic gap fill-in or optical coupling while reducing the average $W_{MMI}$ and thus the overall size/length of the coupler, and (3) by allowing for the use of wider access waveguides without increasing the average $W_{MMI}$ and the corresponding length, $L_{MMI}$, thereby decreasing transmission losses and increasing manufacturing width tolerances, $\Delta W$.

Additional uses and advantages of the present invention will be apparent to those skilled in the art upon review of the detailed description presented below in conjunction with the disclosed figures.

SUMMARY OF THE INVENTION

The present invention overcomes the aforementioned shortcomings by providing for an MMI coupler that maintains the approximate power splitting ratio of MMI devices having straight line sidewalls, and has smoothly continuous inwardly curved tapered sidewalls confining the MMI region wherein the average width of the MMI device is shorter than a comparable device with straight line sidewalls. Because the inward curved taper decreases the average width of the coupler, various advantageous characteristics can be exploited. How to best exploit these advantageous characteristics will be application dependent and a matter of design preference.

First, because the overall length of the MMI coupler is proportional to the square of the average width of the MMI region, $L_{MMI} \propto W^2_{MMI}$, even a relatively modest taper that decreases the average width can result in substantially smaller couplers than previously available. Moreover, because smaller length devices can be achieved without reducing the width of the coupler at its end points, waveguides can remain sufficiently spaced to avoid optical coupling as described above.

Second, if achieving the smallest length device is not a design criteria, use of tapered sidewalls according to the invention can be used to increase the width of the coupler at its endpoints without increasing the device's length. This allows access waveguides to be spaced further apart, thereby diminishing manufacturing defects such as lithographic gap fill-in as described above. Alternatively, wider access waveguides can be used minimizing transmission losses and increasing manufacturing width tolerances, $\Delta W$, of the MMI region as described above.

Devices according to this invention can thus be used to minimize size, reduce optical coupling, reduce transmission losses, avoid lithographic gap fill-in and increase manufacturing tolerances. It is a matter of design preference which advantage to maximize in any given application.

DETAILED DESCRIPTION

A preferred embodiment of the invention will now be described with reference to the attached FIGS. 1–8.

As noted, a variety of MMI based devices are useful components in integrated optical circuits. The preferred embodiment of this invention will be described using one of the more common applications, i.e., power splitters. However, it will be apparent to those skilled in the art that the invention is applicable to other MMI based device such as, for example, with expanders or spot size converters. These devices, which maintain roughly equal power splitting among the output states, have to date been designed using straight line sidewalls.

Figure 1:
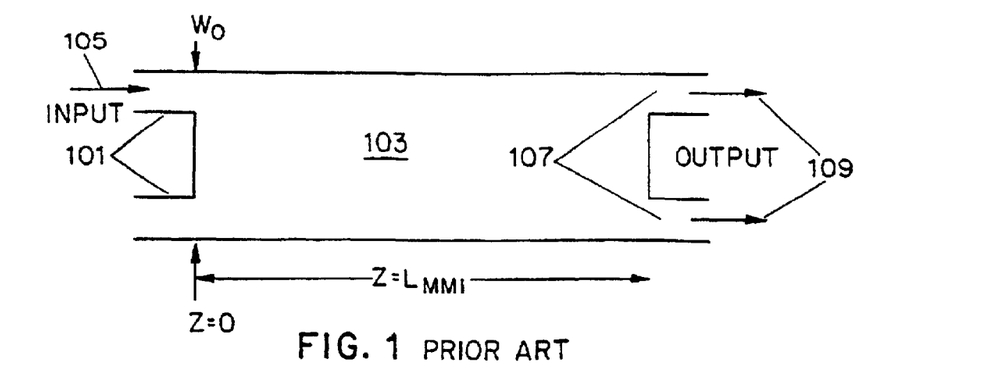
FIG. 1 is a prior art straight 2×2 MMI coupler, typical of a 3-dB power splitter having straight line sidewalls.

FIG. 1 shows the well known structure of "straight" a 3-dB MMI based power splitter. The device includes two relatively narrow input access waveguides (101), a relatively wide multimode waveguide region (103) capable of supporting a large number of modes when stimulated by an input optical signal (105), and two relatively narrow output access waveguides (107) through which two images of the input optical signal are output. In accordance with the periodic self imaging principle, by which an input signal is reproduced periodically in single or multiple images along the propagation axis, Z, of a multimode waveguide region, the multimode region (103) is dimensioned such that two images of the original input signal (105) will be output through the output access waveguides (107). Each output signal (109) will have approximately half the energy of the input signal. Such a device is commonly referred to as a 3-dB MMI power splitter.

As shown in FIG. 1, the device is dimensioned such that the output images appear along the propagation axis, Z, at $Z=L_{MMI}$ with the multimode region beginning at $Z=0$. The width of the multimode region (103) is shown as $W_0$, and must be wide enough to support a support a sufficiently large number of guided modes for the interference principle to be effective. For the "straight" MMI device shown in FIG. 1, the width of the MMI region $W_{MMI}$ is constant along the propagation axis. A straight 3-dB coupler designed with general imaging has a device length of $$L_{MMI} = 2n_{eff} W^2_{MMI}/\lambda.$$

where $n_{eff}$ is the MMI region's effective index and $\lambda$ is the wavelength. It may be noted that in strongly confining, high-contrast waveguides, the MMI region width, $W_{MMI}$, which appears in the above formula, is the physical width of the MMI region. However, in weakly confining, low contrast structures, the Goos-Haenchen effect must be taken into account, such that the $W_{MMI}$ becomes an effective width. See Soldano et al. cited above. For purposes herein, $W_{MMI}$ is considered the physical width of the MMI region.

Accordingly, because $L_{MMI} \propto W^2_{MMI}$ the most effective means to control the overall length of the device is by scaling $W_{MMI}$. However, as discussed in the background section above, there are certain practical limitations caused by lithographic gap fill-in, optical coupling, transmission loss or impractical or unachievable manufacturing width tolerances. To date, the smallest known straight 3-dB MMI based coupler claims to have achieved a reduction in length to 107 microns. See Spieckman et al. cited above. Typical lengths for the smallest available 3-dB couplers are a few hundred microns. The present invention allows practical sizes down to 50 microns or less.

Figure 3:
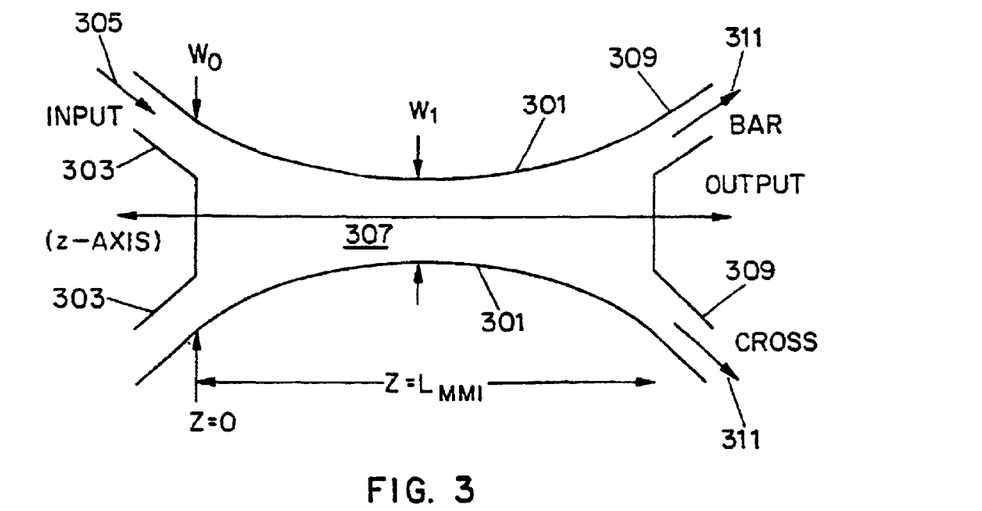
FIG. 3 is a 2×2 MMI coupler according to the invention having curved inwardly tapered sidewalls for use as a 3-dB power splitter.

A 3-dB MMI based coupler according to the invention is shown in FIG. 3. The principle distinction between the devices depicted in FIG. 1 and FIG. 3 is that each opposing sidewall (301) of the MMI region in FIG. 3, instead of being a straight line, is inwardly tapered toward the opposing sidewall. Because the opposing sidewalls (301) define the width of the MMI region $W_{MMI}$ at each position along the propagation axis, Z, the inward taper causes the average width of the MMI region to be less than the average width of the comparable straight MMI device as shown in FIG. 1. This decrease in average width translates into a decrease in $L_{MMI}$ in light of the aforementioned relationship $L_{MMI} \propto W^2_{MMI}$.

In FIG. 3, the 3-dB MMI device according to the invention is shown to have two relatively narrow input access waveguides (303) capable of carrying an input light signal (305), a relatively wide multimode region (307) capable of supporting a sufficiently large number of modes when simulated by an input optical signal (305) to permit the interference based imaging properties of an MMI region to be effective, and two relatively narrow output access waveguides (309) through which the images of the input signal output. The output images (311) are commonly referred to as the bar and cross states. The entire 3-dB coupler is dimensioned such that the two output images appear at $Z=L_{MMI}$. However, since the average $W_{MMI}$ is smaller than that in a comparable straight 3-dB MMI device, the overall length, $L_{MMI}$, will be shorter based on the relationship $L_{MMI} \propto W^2_{MMI}$.

To function according to the invention, the tapers must be smoothly continuous with continuous derivatives along the propagation axis and be inwardly biased toward the opposing sidewall to ensure a decrease in the average width of the MMI region. If the taper's derivative is discontinuous, as shown in the triangular linear taper (202) in FIG. 2, this will cause unwanted power transfer between the output images, as will be discussed further below. It may also be advantageous to limit the maximum curvature of the taper according to the present invention, as characterized by the second derivative of the $W_{MMI}$ along the propogation axis, such that the adiabaticity of the guided modes is approximately maintained, thereby limiting mode conversion within the MMI region, which could lead to a deterioration of device performance.

For purposes of illustrating a preferred embodiment, the tapers of the opposing sidewalls (301) are shown to have a parabolic taper W(Z) along the propagation axis, Z, according to $$W(Z) = W_1 + (W_0 - W_1)\left(\frac{L_{MMI}}{2} - Z\right)^2$$

where $W_0$ is the width of the MMI region at Z=0 and $Z=L_{MMI}$, $W_1$ is the width at $$\frac{L_{MMI}}{2}$$

and Z is the direction of propagation. This parabolic shape is relatively simple to manufacture.

Figure 2:
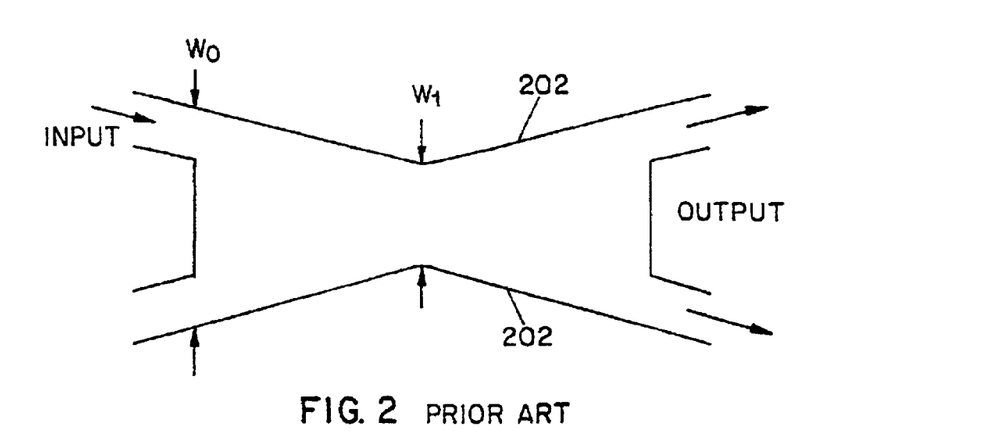
FIG. 2 is a prior art tapered 2×2 MMI coupler with linear triangular tapers having a discontinuous derivative at its inflection point, used for variable image power distribution.

The access waveguides (305, 309) are placed such that their outside edges coincide with the edges of the MMI region. The angles of the access waveguides are set to match the local taper angles at the ends of the MMI region. Tilting the access waveguides in this manner keeps the phase tilt of the input image (305) approximately along a coordinate system which is conformal with respect to the endwalls of the tapered MMI region. This, combined with the fact that the taper has no discontinuity at $L_{MMI}/2$ minimizes the phase changes that may occur, for example, due to the discontinuous change in slope present in the triangular linear taper at $z=L_{MMI}/2$ as shown in FIG. 2. See, Besse, Gini, Bachmann and Melchior, *New 2x2 and 1x3 Multimode Interference Couplers With Free Selection of Power Splitting Ratios*, Journal of Lightwave Tech., Vol. 14, pp. 2286–92, 1996. Absent the discontinuity of the Besse et al. type device, as shown in FIG. 2, the imaging properties of the straight sidewall device are generally preserved by the present invention as the width is tapered. That is, although the walls of the structure are curved, the intensity distribution exhibits imaging patterns along the length of the device similar to that in the straight MMI device, of the type shown in FIG. 1.

In the embodiment shown in FIG. 3, the taper of both sidewalls is shown to be a symmetric reflection around the centerline of the propagation axis. Similarly, the tapers are symmetric about a centerline drawn orthogonal to the propagation axis at $Z=L_{MMI}/2$. The tapers accordingly have a single extrema within the multimode region where the derivation of the taper along the propagation axis is zero, i.e., dW(Z)/dz=0. This two-fold symmetry with a single extrema can be reproduced by a variety of simple functions that can be easily imported to an MMI device, such as hyperbolic tapers, elliptical tapers, cosinusoidal tapers and the like. Of course, non-symmetric inward tapes with multiple extrema can be utilized, provided the tapers have continuous derivatives that result in smaller average widths of the MMI region, and still enjoy the advantages of the present invention. While the use of such non-symmetric or multiple extrema tapers may not provide optimal power splitting functionality, the device would function as a power splitter and may be used for other MMI based functions that wish to employ the advantages of reducing the average width of the MMI region. It is likewise possible to have one of the sidewalls be straight and only inwardly taper the opposing sidewall to decrease the average width of the MMI region, and still enjoy the benefits of the invention.

Additionally, for the configuration shown in FIG. 3, the width of the MMI region at Z=0 and $Z=L_{MMI}$ are the same. While this configuration is optimized for a 3-dB power splitter, varying the width of the MMI region at the input end and output end can be useful in other MMI based devices such as mode expanders or spot size converters. These devices can also enjoy the advantages of the present invention by providing a continuous curved taper to reduce the average $W_{MMI}$.

The device according to the invention, as shown, for example, in FIG. 3, can be characterized by the splitting ratio, length and total transmission as a function of the normalized width variation $d\Omega=(W_0-W_1)/W_0$. The splitting ratio is defined as the power output from one of the output access waveguides divided by the sum of the output power from both output waveguides. Thus, for a perfect 3-dB power splitter the splitting ratios for both output states would be 0.5. The transmission is the ratio of the total power of the input signal to the total combined power of the output signals. Thus, for a device experiencing no transmission loss, the total transmission ratio would be 1.0. The length reduction is the total length of the MMI region for the curved tapered device according to the invention divided by the length of the MMI region of the comparable device having straight sidewalls. All these characteristics for devices according to the inventor can be shown as a function $d\Omega$. Where $d\Omega=0$, the device is a conventional straight edged device. The tapers become increasingly pronounced as $d\Omega$ approaches 1, at which point the opposing sidewalls would touch.

Figure 4:
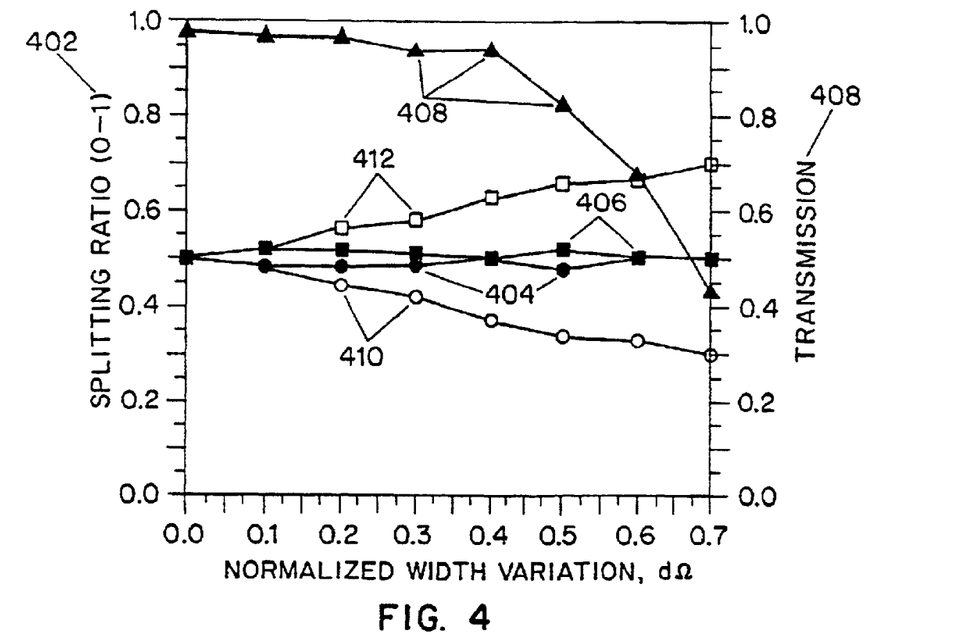
FIG. 4 is a graph showing the total power transmission of a 2×2 MMI device according to the invention and a comparison of the power splitting ratio of 2×2 MMI power splitters according to the prior art linear triangle taper device and a device according to the present invention.
Figure 5:
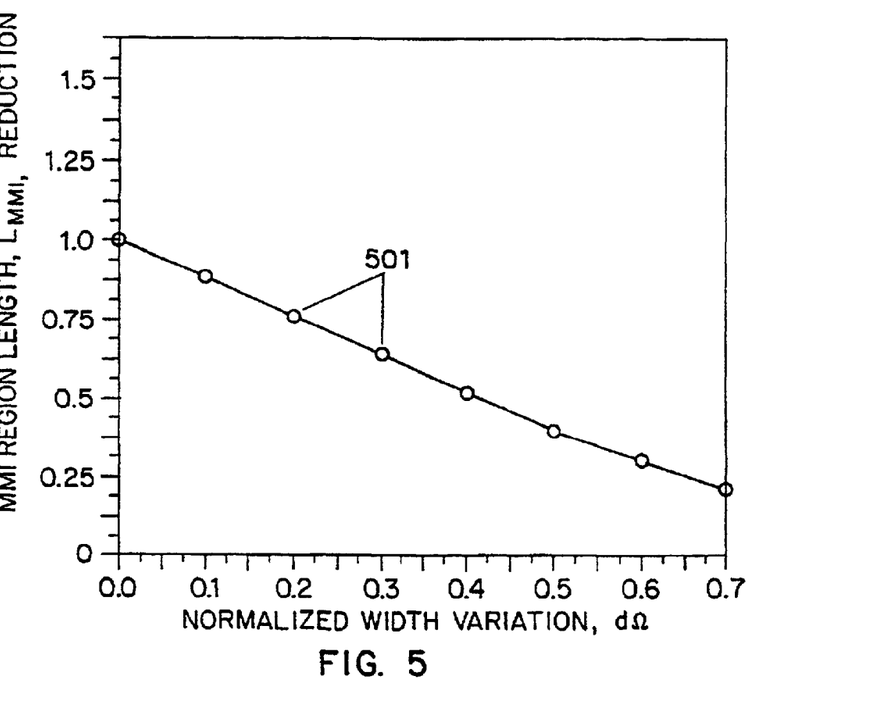
FIG. 5 is a graph showing the decrease in device length of a 2×2 MMI coupler achieved in accordance with the invention.

FIG. 4 shows the splitting ratio (402) for the 3-dB MMI device illustrated in FIG. 3. The solid circles (404) and squares (406) show the ratios for the cross and bar output access waveguides, respectively. As can be seen, the power splitting functionality of the 3-dB splitter, i.e., ratio≈0.5, is maintained over a large range of $d\Omega$. Of course, as will be apparent to those skilled in the art, it should be noted that $d\Omega$ is inherently limited by the requirement that the MMI region be sufficiently wide to support the relatively large number of modes necessary to preserve the interference based imaging quality of the MMI devices. Similarly, as shown in FIG. 4, the total transmission ratio shown by the solid triangles (408) remains above 0.8 up to $d\Omega=0.5$ for the 3-dB device shown in FIG. 3. Moreover, as can be seen in FIG. 5, which illustrates the normalized length of the MMI region as a function of $d\Omega$, the length shown by the connected circles (501) decreases by a factor of approximately 2 at $d\Omega=0.4$.

It is useful at this point to compare the functionality of the present invention to the known prior art where a linear triangular taper is used to effect phase induced power transfer between output waveguide states. See, e.g., Besse, Gini, Bachmann and Melchior, cited above. The purpose of the triangular discontinuous taper (202) in FIG. 2 is to induce phase variations to cause variations in the power splitting ratios, as compared to straight sidewall devices, as a function of $d\Omega$. See, Besse, Gini, et al. As can be seen in FIG. 4, the splitting ratios of the output states for the triangular discontinuous taper device, shown as open circles (410) and squares (412) diverge as $d\Omega$ increases. In contrast, the purpose of the present invention is to preserve the imaging characteristics of straight line MMI devices while shrinking their size, avoiding optical coupling between access waveguides, improving manufacturing tolerances and improving transmission quality, as described in the Background section above, without encountering such phase change effects, as the goal of the prior art discontinuous taper device shown in FIG. 2.

As noted, the benefits of the present invention are not limited to decreasing the size of MMI based devices. For example, if the principle design goal for a device is not to achieve the smallest possible length, the invention can be used to diminish transmission loss within access waveguides and improve manufacturing width tolerances, $\Delta W$. These results can be achieved because the invention will allow devices with wider widths at the ends of the device, $W_0$ at $Z=0$ and $Z=L_{MMI}$ in FIG. 3, without sacrificing overall length due to the effect of the tapering. The wider end widths of the MMI region allow for the use of wider access waveguides which cause less transmission loss and improves manufacturing width tolerances of the MMI region. Further, wider end widths would also allow access waveguides to be spaced further apart, thereby decreasing any optical coupling or power transfer between the access waveguides, and additionally limit manufacturing defects caused by problems such as lithographic gap fill-in. It is a design preference in utilizing the invention as to how much one wishes to minimize size as opposed to taking advantage of the other improvements made available by using the tapered sidewalls and reduced average width of the MMI region according to the invention.

Of course, the invention is not limited to the 2×2 couplers described above. The advantages achieved by decreasing the average width of the MMI region using smoothly continuous tapers according to the invention can be applied in general to N×M MMI based couplers, where N is the number of input access waveguides and M is the number of output access waveguides.

Figure 6:
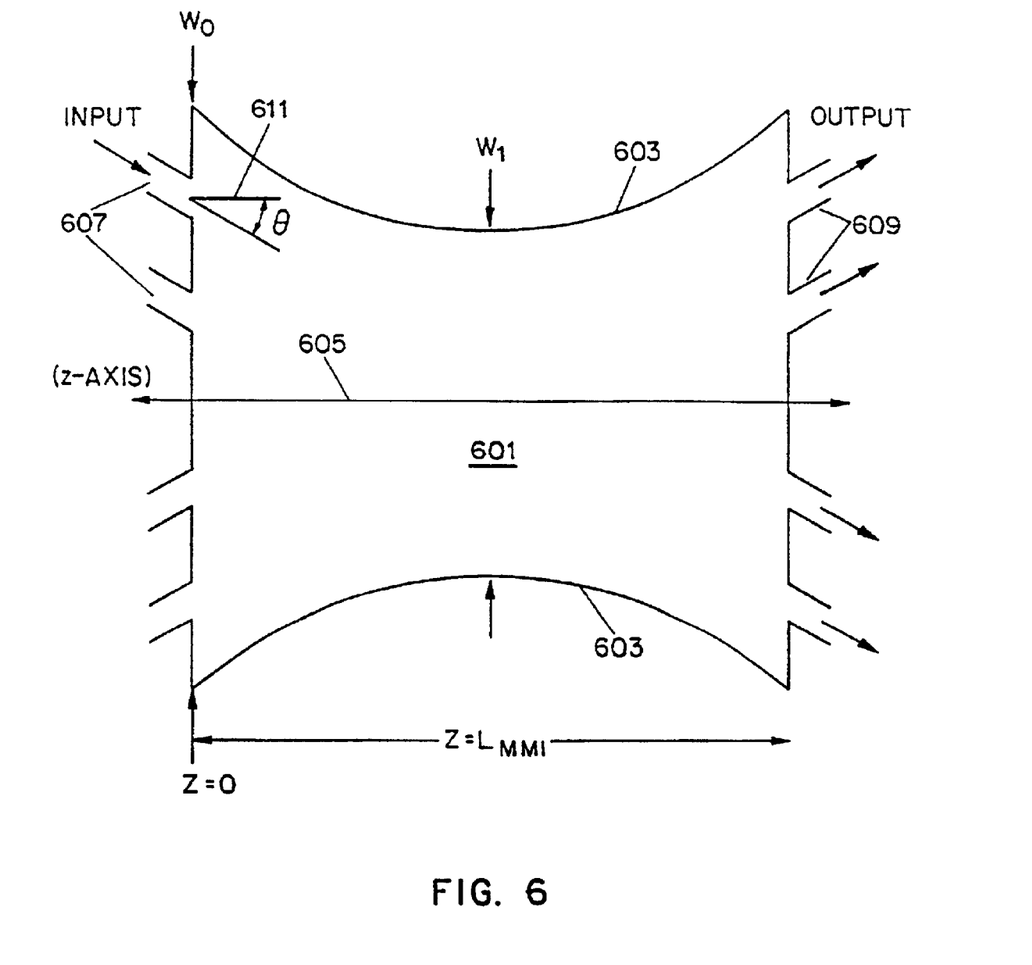
FIG. 6 is a 4×4 MMI coupler according to the invention having curved inwardly tapered sidewalls.

For example, FIG. 6 shows a 4×4 MMI coupler according to the present invention. FIG. 6 shows a 4×4 MMI based power splitter. The same self imaging principles are applicable within the MMI region (601) and in general, the required length of the multimode region, $L_{MMI}$, to obtain the first appearance of N images of an input optical signal is given as $$L_{MMI} = \frac{4n_{eff}W_{MMI}^2}{N\lambda}$$

Accordingly, the length of these devices decreases with the number of output parts or images, N. The length reduction obtained through use of the parabolic taper shown is by a factor of $1/\chi$, where $$\chi = \frac{1}{2(1-d\Omega)^2(1+\gamma^2)} + \frac{\tan^{-1}(\gamma)}{2\gamma(1-d\gamma)^2}$$

where $\gamma^2=W_0/W_1-1$.

As shown in FIG. 6, the device has a parabolic taper (603) similar to that for the device shown in FIG. 3, that is symmetric about the propagation or Z axis (605) and about a centerline orthogonal to the Z axis at $Z=L_{MMI}/2$. The device has four input access waveguides (607) and four output access waveguides (609), wherein the angles of the access waveguides, $\theta$, (611) are set to keep the images tilted approximately along a coordinate system which is conformal with respect to the end wall of the tapered MMI region (601) at $Z=0$ and $Z=L_{MMI}$. For a parabolic taper the tilt angle, $\theta$, can be obtained from $$\theta=\tan^{-1}(4y.d\Omega/L_{MMI})$$

where y is the access waveguide position from the center and $d\Omega$ is the normalized width variation as discussed above, i.e., $d\Omega=(W_0-W_1)/W_0$. The width at both ends of the MMI regions, $W_0$, are shown to be equal with each taper having a single extrema at $Z=L_{MMI}/2$ where the width of the device is $W_1$.

Figure 7:
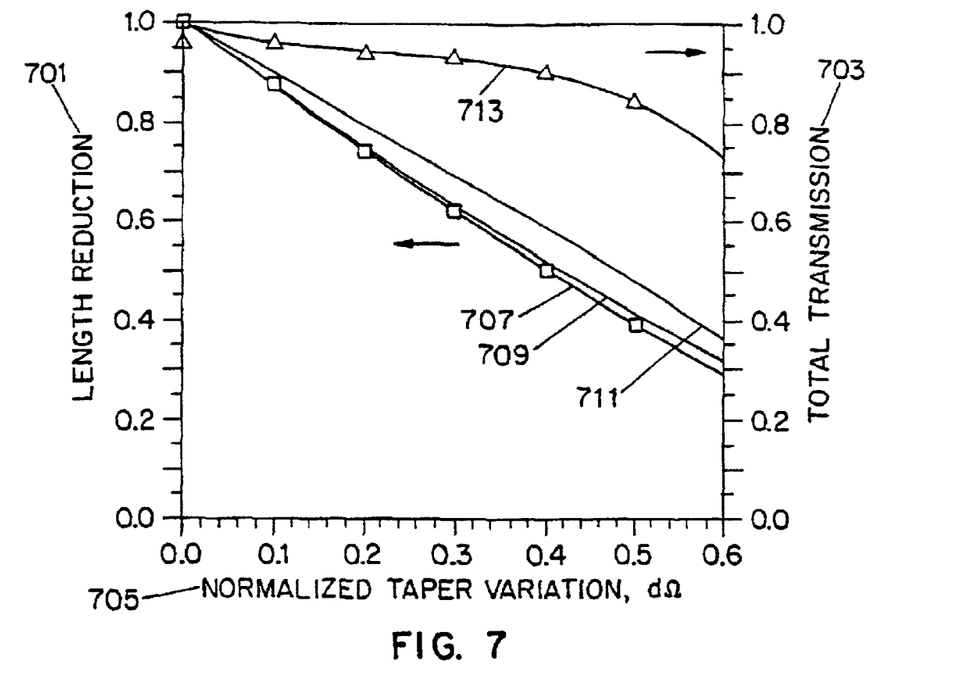
FIG. 7 shows the length reduction for various tapers of a N×N MMI coupler and total transmission of a 4×4 coupler in accordance with the present invention.

FIG. 7 illustrates the device length reduction (701) as compared to a straight edge device for various taper shapes as a function of $d\Omega$ (705) for a general N×N device. The total transmission (703) is also shown as a function of dΩ (705) for an 4×4 device. The length reduction (701) is normalized to the length of a straight edge device, i.e., dΩ=0. Shown are length reductions using parabolic (707), elliptic (709) and cosinusoidal (711) tapers. See Levy, Scarmozzino and Osgood. *Length Reduction of Tapered N×N MMI Devices*, IEEE Photonics Technologies Letters, expected publication June 1998, for taper length reduction calculation. Each taper results in image length reductions of approximately 50% at dΩ=0.4. Similarly, the total transmission curve (713) is shown to stay above 80% for tapers up to dΩ=0.5.

Figure 8:
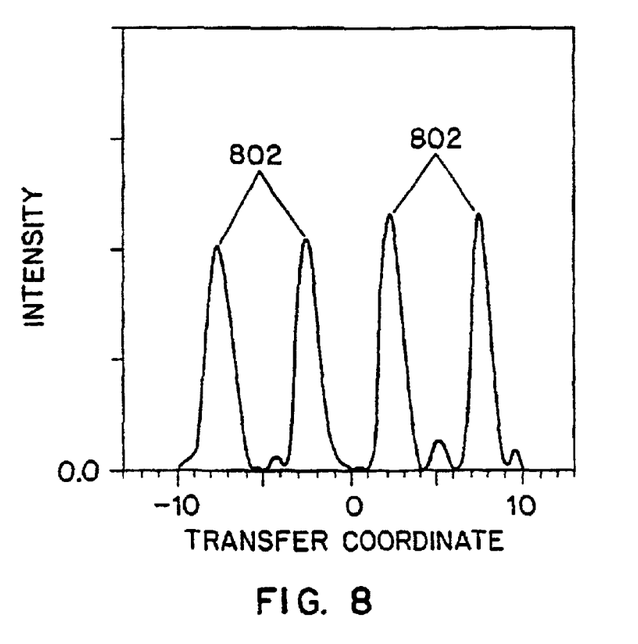
FIG. 8 shows the approximately equal power distribution amongst the four images output from the 4×4 coupler shown in FIG. 6.

FIG. 8 shows the intensity distribution at the end of the MMI region for a dΩ≈0.4 4×4 MMI device such as that shown in FIG. 6. As can be seen, the power splitting functionality is roughly preserved, as the four intensity peaks (802) associated with the four output waveguides (609) have roughly equal power. This can be compared to the power redistribution that results where a discontinuous taper is used per Besse and Gigi et al., as seen in the divergent power curves (410, 412) shown in FIG. 4.

Accordingly, MMI couplers built according to this invention can be expected to have a wide variety of applications in a wide variety of N×M devices where preserving power splitting functionality, size limitations, improved transmission, improved manufacturing width tolerances, reduced optical coupling and reduced lithographic fill-in defects are desired.

While the invention has been described in terms of the foregoing specific embodiments, it will be apparent to those skilled in the art that various alterations and modifications may be made to the described embodiment, particularly with respect to the shape of the inward tapers, without departing from the scope of the invention, as defined by the appended claims.

What is claimed is:

1. A self-imaging multimode interference based coupler comprising:
   a. at least one input access waveguide for inputting an input optical signal into a first end of the multimode interference based coupler;
   b. at least one output access waveguide for outputting images of the input optical signal from a second end of the multimode interference based coupler; and
   c. a multimode region coupling the one or more input waveguides to the one or more output waveguides through which the input optical signal propagates from the first end to the second end along a propagation axis and is reimaged at the one or more output access waveguides, wherein
      i. the multimode region has two opposing sidewalls which define a width of the coupler at each point along the propagation axis;
      ii. at least one of the sidewalls of the multimode region has a non-linear taper inward toward the opposing sidewall such that the coupler has an average width along the propagation axis that is less than the average width had the sidewalls both been straight lines; and
      iii. the sidewalls are smoothly continuous with continuous derivates along the propagation axis;
   wherein the at least one input access waveguide is positioned with respect to the propagation axis at an angle, the angle selected to maintain images tilted approximately along a coordinate system which is conformal with respect to the first and second end.

2. The multimode interference based coupler of claim 1, wherein both sidewalls have non-linear inward tapers toward the opposing sidewall with the taper of both sidewalls being symmetric reflections about a center line along the propagation axis.

3. The multimode interference based coupler of claim 2, wherein the tapers have a single extrema within the multimode region where the derivative along the propagation axis is zero.

4. The multimode interference based coupler of claim 3, wherein the coupler has equal widths at the first end and the second end.

5. The multimode interference based coupler of claim 4, wherein the two sidewall tapers are symmetric about a center line, orthogonal to the propagation axis, midway between the first end and the second end of the coupler.

6. The multimode interference based coupler of claim 4, wherein the input and output access waveguides couple to the multimode region at an angle set to match a local taper angle at the ends of the MMI region.

7. The multimode interference based coupler of claim 3, wherein the taper shape is parabolic, hyperbolic, elliptical or cosinusoidal.

8. The multimode interference based coupler of claim 2, wherein the coupler has equal widths at the first end and the second end.

9. The multimode interference based coupler of claim 8, wherein the two sidewall tapers are symmetric about a center line, orthogonal to the propagation axis, midway between the first end and the second end of the coupler.

10. The multimode interference based coupler of claim 8, wherein the input and output access waveguides couple to the multimode region at an angle set to match a local taper angle at the ends of the MMI region.

11. The multimode interference based coupler of claim 8, wherein the taper shape is parabolic, hyperbolic, elliptical or cosinusoidal.

12. The multimode interference based coupler of claim 1, wherein the taper maximum curvature, as characterized by the second derivative of the taper along the propogation axis, is limited such that the adiabaticity of guided modes is substantially maintained.

13. A 2×2 self-imaging multimode based power splitter comprising:
   a. two input access waveguides for inputting an optical signal into a first end of the power splitter;
   b. two output access waveguides for outputting two images of the input optical signal from a second end of the power splitter; and
   c. a multimode region coupling the two input waveguides to the two output waveguides through which the input optical signal propagates along a propagation axis and is reimaged as two images of the input signal, the images having approximately half the intensity of the input signal, wherein
      i. the multimode region has two opposing sidewalls which define a width of the power splitter at each point along the propagation axis with the width of the first end and second end being substantially equal; and
      ii. the sidewalls are symmetrically tapered inward toward each other around a center line of the propagation axis wherein the taper is a continuous curve having a continuous derivative along the propagation axis with a single extrema within the MMI region where the derivative along the propagation axis is zero;

wherein at least one of the two input access waveguides is positioned with respect to the propagation axis at an angle, the angle selected to maintain images tilted approximately along a coordinate system which is conformal with respect to the first and second end.

14. The power splitter of claim 13, wherein the taper is symmetric about a center line orthogonal to the propagation axis midway between the first end and the second end of the power splitter.

15. The power splitter of claim 14, wherein the taper shape is parabolic, hyperbolic, elliptical or cosinusoidal.

16. The power splitter of claim 13, wherein the input and output access waveguides couple to the multimode region at an angle set to match a local taper angle at the ends of the MMI region.

17. The power splitter of claim 13, wherein the taper maximum curvature, as characterized by the second derivative of the taper along the propagation axis, is limited such that the adiabaticity of guided modes is substantially maintained.

* * * * *

UNITED STATES PATENT AND TRADEMARK OFFICE
CERTIFICATE OF CORRECTION

| | | |
|---|---|---|
| PATENT NO. | : 6,792,172 B1 | Page 1 of 1 |
| APPLICATION NO. | : 09/674821 | |
| DATED | : September 14, 2004 | |
| INVENTOR(S) | : David S. Levy, Robert Scarmozzino and Richard M. Osgood, Jr. | |

It is certified that error appears in the above-identified patent and that said Letters Patent is hereby corrected as shown below:

IN THE SPECIFICATION:

Col. 1, line 8 - 9:

" "Contract No. F49620-95-0403" "

--should read --"Contract No. F49620-95-1-0403"--

Signed and Sealed this

Twenty-sixth Day of December, 2006

JON W. DUDAS
*Director of the United States Patent and Trademark Office*